United States Patent [19]
Peberdy

[11] 3,846,772
[45] Nov. 5, 1974

[54] FIRE DETECTOR RESPONSIVE TO AMPLITUDE MODULATION OF A PULSED EM BEAM

[75] Inventor: William T. Peberdy, Thatcham, England

[73] Assignee: Chubb Fire Security Limited, Middlesex, England

[22] Filed: Aug. 6, 1973

[21] Appl. No.: 385,708

[30] Foreign Application Priority Data
Aug. 11, 1972 Great Britain .................... 37633/72

[52] U.S. Cl. .......... 340/227 R, 250/564, 340/228 R, 340/420, 356/206
[51] Int. Cl. ...................... G08b 17/10, G08b 17/12
[58] Field of Search ............. 340/227 R, 228.2, 420, 340/418, 421, 228 R; 250/564, 215; 356/207, 51

[56] References Cited
UNITED STATES PATENTS

| | | | |
|---|---|---|---|
| 2,794,974 | 6/1957 | Bagno et al. ..................... | 340/228.2 |
| 3,461,443 | 8/1969 | Vasel .............................. | 340/228 R |
| 3,566,385 | 2/1971 | Lawson ........................... | 340/228 |
| 3,723,746 | 3/1973 | Lawson et al. .................. | 356/207 |

Primary Examiner—Glen R. Swann, III
Attorney, Agent, or Firm—Larson, Taylor & Hinds

[57] ABSTRACT

In fire-detection apparatus of the kind in which a radiation receiver is exposed to a source of radiation through an intervening gaseous medium, the beam of radiation overlaps the receiver so that the beam continues to cover the receiver despite minor changes in beam direction due, for example, to movement of the surfaces supporting the emitter and receiver. Discrimination against ambient radiation is improved by causing the source, which is a solid-state emitter, to emit pulses of radiation and by having a frequency-selective circuit for selecting from the output of the radiation-sensitive device in the receiver a pulse signal resulting from the received pulses of radiation; an alarm circuit is responsive to an amplitude modulation in this pulse signal at a frequency which is typical of the modulation produced by a fire heating the gaseous medium between the source and the receiver.

9 Claims, 6 Drawing Figures

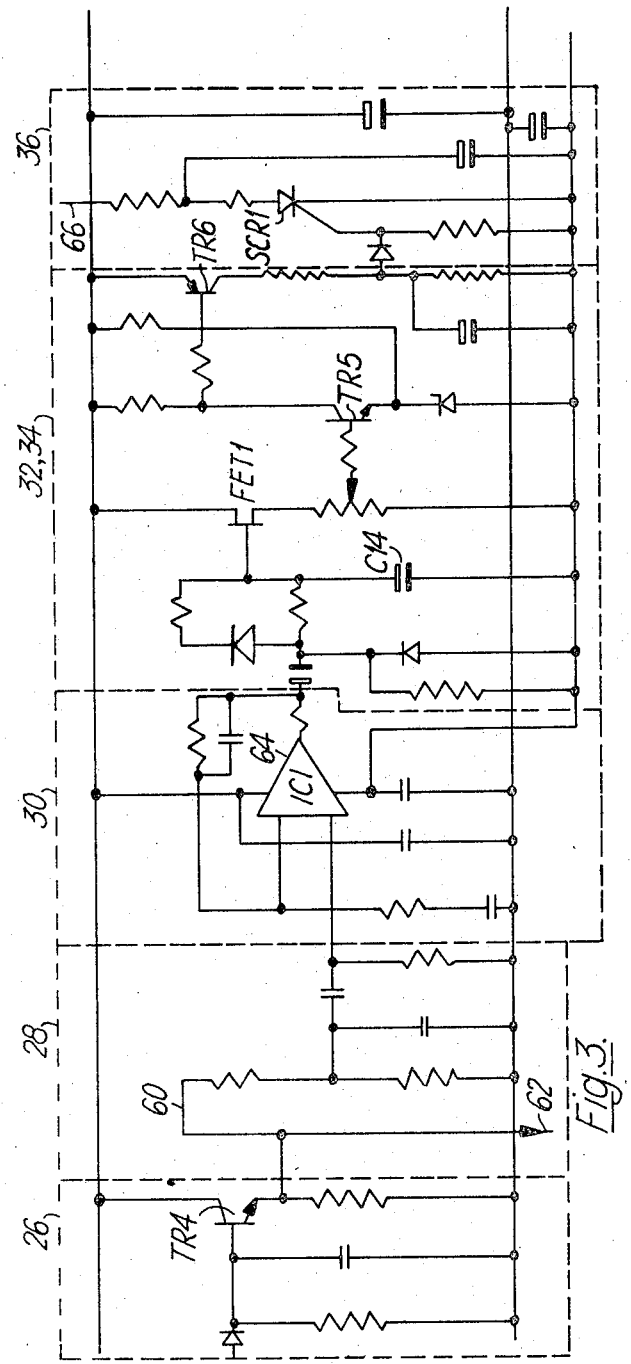

FIRE DETECTOR RESPONSIVE TO AMPLITUDE MODULATION OF A PULSED EM BEAM

BACKGROUND OF THE INVENTION

Fire alarms using optical detectors have generally relied upon smoke detection. In a first type, light from a source falls directly on a light detector, the light incident on the detector being reduced in the presence of smoke, and in a second type a barrier prevents the direct transmission of light from the source to the detector but in the presence of smoke light reaches the detector along indirect paths after diffraction and/or reflection by the smoke particles. The latter form of detector has generally been preferred.

Detectors in which the light-sensitive device is directly exposed to a light beam may have the light source and light-sensitive device enclosed in a detector cell or may be such that the light-sensitive device is also subject to ambient light. A difficulty with a detector subject to ambient light is that the signal which it produces due to the ambient light may be of such an amplitude that it becomes difficult to sense changes in the light from the source. In one proposal a laser was used to provide a narrow beam of light and this beam was refracted by the heated air and other heated gases in the presence of a fire and, in some cases, moved off the light-sensitive device. Whilst this produces a sharp beam cut-off in the presence of a fire, the effect of the ambient light is still felt and there is the further disadvantage that the aiming of the laser beam is very critical and the stability required for the laser mounting may be greater than can be achieved in some buildings, where normal wall movement may cause the narrow laser beam to wander off the target. Although it is possible to detect such movement and to restore the beam position by means of a servo mechanism, this solution is expensive.

BRIEF DESCRIPTION OF THE DRAWING

Fire-detecting apparatus according to the present invention comprises: a source of radiation including a solid-state emitter emitting a beam of radiation in a series of pulses; radiation-receiving means positioned to receive radiation which has passed through an intervening gaseous medium from the said source and including a device sensitive to the received radiation to produce a corresponding electric signal, the beam of radiation, where incident on the radiation-receiving means, overlapping the radiation-receiving means around the whole of its perimeter; a frequency-selective circuit for selecting, from the output of the radiation-sensitive device, a pulse signal resulting from the pulses of radiation from the said source; and an alarm circuit connected to receive this pulse signal and responsive to an amplitude modulation thereof indicative of the effect of a fire on the said intervening gaseous medium.

To detect the presence of hot gases, such a detector system does not utilise change of position of the incident beam as a whole relative to the detector surface, because the wide beam will always cover the whole of the detector surface, but relies on fluctuation of intensity within the beam cross-section, giving a fluctuation with time in the radiation received over the detector surface. Minor variations in the direction of the beam due to wall movements, for example, merely move a different part of the beam on to the radiation-receiving surface of the detector. The total amount of radiation received by the detector is substantially unaffected by such movements.

Figure 1:
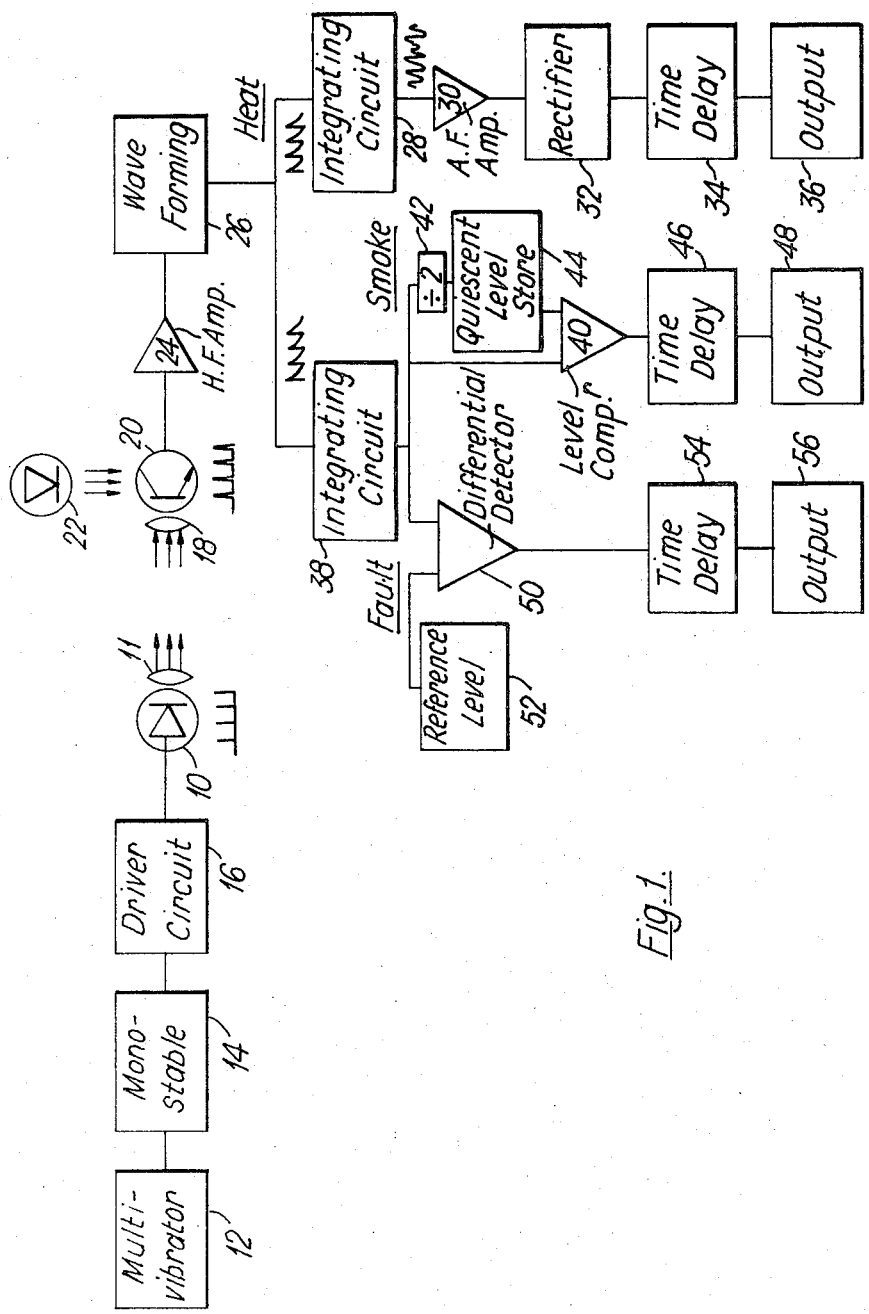

The use of a pulsed source of radiation in combination with a frequency-responsive circuit in the receiver permits most of the "noise" signals, that is to say signals due to ambient radiation, to be filtered from the receiver output. For detection of modulation due to hot air or other hot gases the frequency of the pulses of radiation from the source must be sufficient to permit the emitted pulses of radiation to be distinguished from the modultion due to hot air and other hot gases in the present of fire. In general, such modulation will lie between 1 Hz and 150 Hz and the pulses of radiation from the source must therefore have a frequency greater than this.

In our preferred alarm, we use a semi-conductor light source, for example an infra-red light source of the gallium arsenide kind, and we pulse this infra-red source at a frequency of 1,000 Hz, each pulse lasting for about 2 microseconds. This permits signals due to ambient light to be filtered out, together with pulsed signals due to mains lighting which are at a frequency less than 1,000 Hz; in addition, the signal at 1,000 Hz is easier to amplify than a D.C. signal. This permits the detection of a very weak signal and therefore permits the use of a wide beam. It has the further advantage that the gallium arsenide source may be pulsed at very high power since it is switched on for only a very short time.

It is convenient to use a silicon photo-transistor as a detector but this introduces one further difficulty, namely that although signals due to ambient illumination can be satisfactorily filtered out, the strength of the remaining signals undergoes considerable variation with variations in the ambient illumination. To operate such a photo-transistor so that stronger and more consistent signals are obtained, we include in our preferred form of apparatus means for giving the photo-transistor a constant forward bias. As will be explained, this has the effect of shifting the operating point of the photo-transistor along its characteristic curve to a point at which further increases in collector current due to variations in ambient illumination have no substantial effect on the gain of the transistor. In the preferred form, the constant bias is provided by irradiating the phototransistor with a subsidiary light source of substantially constant level, but it can also be achieved by supplying an electrical forward bias to the base of the photo-transistor.

We have also found that the effect of the flicker frequency of mains illumination on the output of the detector can be further reduced, if the emitter in the heat detection apparatus is of a kind having a rapid rise time when pulsed, by making the receiver responsive not to the pulse frequency but to a frequency based on the rise time of the pulse of radiation from the emitter.

Preferably, following this frequency-responsive circuit which selects from the output of the detector only the pulse signal resulting from the emitter pulses, there is a further frequency-sensitive circuit which is primarily responsive to those fluctuations in the amplitude of the received pulses which are at a frequency between 2 Hz and 25 Hz, the range in which the strongest modulation occurs in the presence of a fire.

If desired, the output from the radiation-sensitive device, or from a further radiation-sensitive device receiving the same pulsed beam from the emitter, is used to indicate obscuration of the beam by smoke as well as refraction of the beam due to passage through hot gases. This permits the apparatus to respond rapidly both to fires in which there is considerable heat but little smoke and also to fires of the kind in which smoke is generated before the heat becomes sufficient to modulate the pulsed signal.

DESCRIPTION OF THE PREFERRED EMBODIMENT

Figure 2:
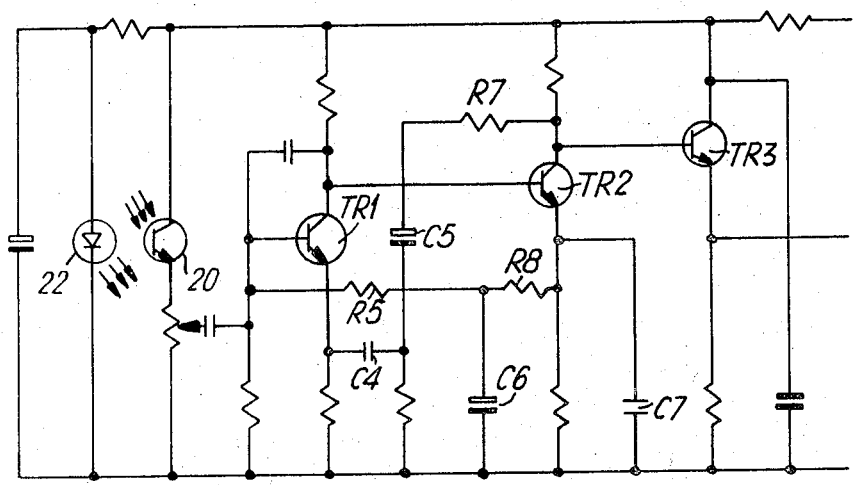
Figure 4:
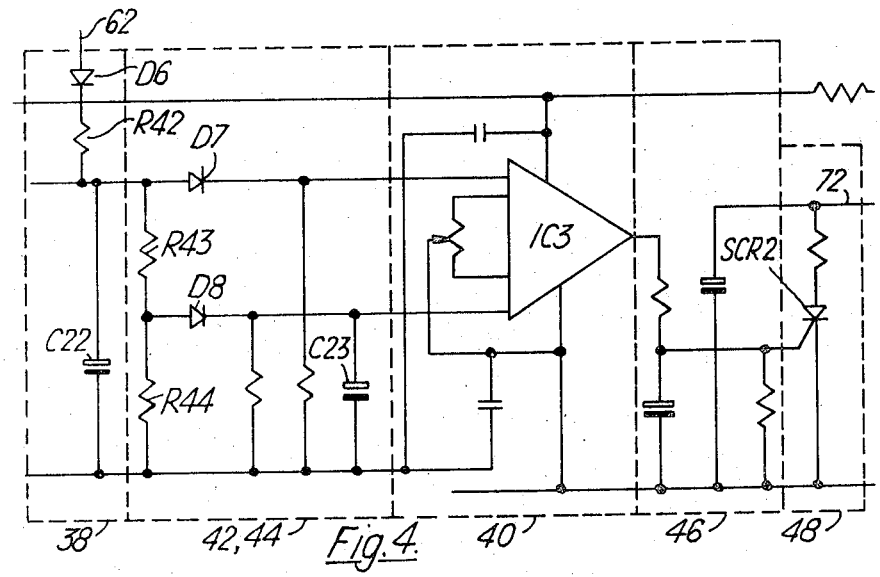
Figure 5:
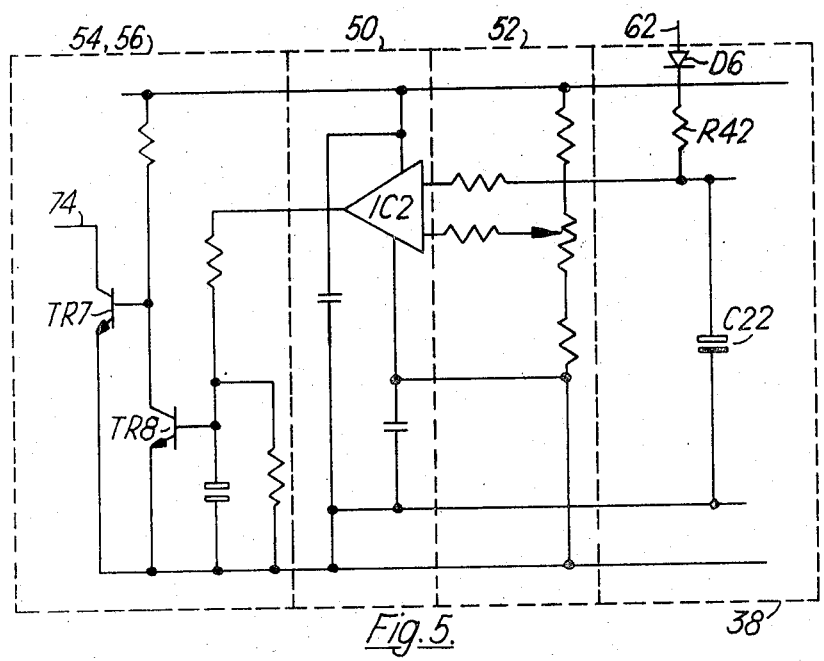

In order that the invention may be better understood, one example of apparatus embodying the invention will now be described with reference to the accompanying drawings, in which:

FIG. 1 is a block diagram of apparatus embodying the invention;

FIG. 2 is a circuit diagram of the HF amplifier stage of the receiver;

FIG. 3 is a circuit diagram of the heat detector, following the amplifier stage of FIG. 2;

FIG. 4 is a circuit diagram of a smoke detector, used in combiantion with the heat detector in the apparatus of FIG. 1;

FIG. 5 is a fault detector used in the apparatus of FIG. 1; and

Figure 6:
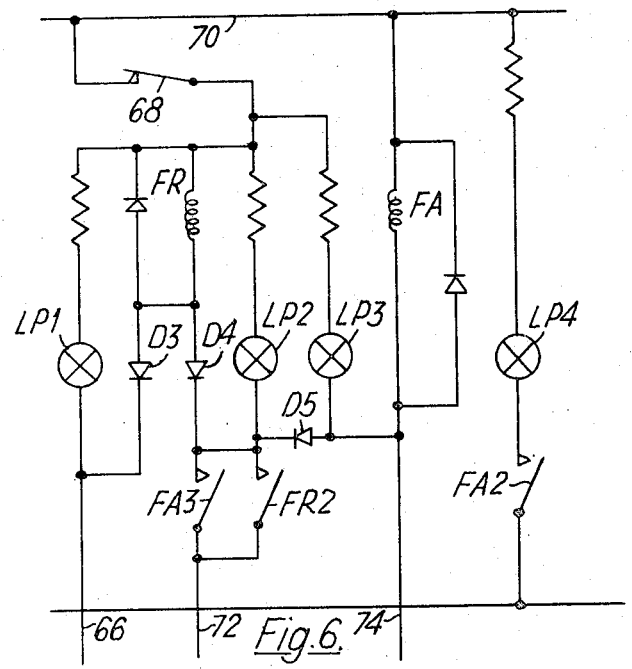

FIG. 6 shows the output circuits of FIG. 1.

DESCRIPTION OF THE PREFERRED EMBODIMENT

In FIG. 1, the source 10 of radiation is a gallium arsenide diode emitting light in the infra-red portion of the spectrum. In front of the diode 10 there is a moulded bi-convex lens. The optical output is a diverging beam which has a width of approximately 1 foot (30 cm.) at a range of 100 feet (30 metres).

The diode is pulsed by means of a free running multivibrator 12, operating at a frequency of approximately 1,000 Hz, driving a monostable pulsing circuit 14, the pulses from which have a pulse width of about 2 microseconds. These pulses are directly coupled to a low impedance switching circuit 16 controlling the supply feed to the photo-emitting diode 10.

At the receiver, a bi-convex lens 18 has a phototransistor 20 mounted at fixed focus behind it. A lightemitting diode 22 floods the photo-transistor 20 with biasing light of constant intensity to reduce the variation of gain of the photo-transistor with different levels of ambient light.

The output of the photo-transistor is applied through an HF amplifier stage 24 to a waveforming circuit 26. The output of the circuit 26 is split, one portion going to the heat-detecting channel and the other to the smoke-detecting channel and to the fault channel. The heat-detecting channel includes an integrating circuit 28 responsive to the pulses from the waveforming circuit, an audio-frequency amplifier 30, which is frequency-selective so as to pass signals at the frequencies produced by hot gases in the path of the beam, a rectifier 32, a time delay circuit 34, and an output circuit 36.

In the smoke channel, the signal from circuit 26 passes through an integrating circuit 38 to a level comparator 40. The comparator also receives a signal from a quiescent signal level store 44, which derives its input, through a divide-by-two circuit 42, from circuit 38. When obscuration by smoke reduces the output of the integrating circuit 38 to one half of the quiescent signal level, the comparator 40 supplies an alarm signal to the time delay circuit 46 and thence to the output circuit 48.

The fault channel produces a fault warning in response to spurious signals such as signals caused by sudden obscuration of the beam, e.g., by someone walking into the beam path or by failure of the emitter. In the fault channel, a differential detector 50 compares the output of circuit 38 with a signal from a fault reference level circuit 52. When a fault is detected, the fault signal is applied through a time delay circuit 54 to the output circuit 56. The circuit is so arranged that if a smoke alarm has been registered before the fault signal, the smoke alarm is retained, but a fault condition overrides a subsequent smoke alarm signal until the fault condition is cleared.

Turning now to the more detailed circuit diagram of FIG. 2, as explained above, the effect of daylight, artificial light, heating, and other ambient infra-red radiation is to create a corresponding steady signal which is represented in the output of the photo-transistor 20 by a D.C. signal, the level of which will obviously vary with the ambient conditions. As a consequence, the signal due to the incoming radiation from the diode 10 is superimposed upon a D.C. signal level which is itself a variable. The gain of a transistor varies with the collector current up to a certain value of current and thereafter is substantially constant. Therefore below this value of current, the gain of the circuit for the required A.C. signal varies with the level of ambient radiation. In the present receiver, a further photoemitting diode 22 provides direct illumination of the photo-transistor 20 from within the receiver unit, with the result that the effect of ambient infra-red radiation is reduced to an insignificant proportion of the total steady illumination of the transistor. This provides a forward bias sufficient to bring the transistor operation into the constant-gain region and permits a strong A.C. signal to be derived from the filtered output of the photo-transistor in spite of variations of ambient light.

The output of the diode 20 is applied through transistors TR1 and TR2 to a transistor TR3 in an emitter-follower circuit. Transistors TR1 and TR2 have an A.C. feedback path including resistor R7 and capacitor C5 and C4. Capacitor C4 decouples the emitter resistor of transistor TR1 at high frequencies and capacitor C7 performs the same function for transistor TR2. There is also a D.C. feedback path consisting of resistors R8 and R5, decoupled by capacitor C6.

The time constant of the circuits associated with transistors TR1 and TR2 are chosen to make this circuit responsive in the region of 100 to 330 kHz, i.e., a frequency greater than the 1,000 Hz pulsing frequency of the photo diode 10. This higher frequency response is based on the rise time of pulses from diode 10, and the response rise time of the photo-transistor 20. It permits better discrimination against flicker frequency from electric lighting than could be expected at the pulse frequency.

If desired, a further stage of high frequency amplification can be included.

The amplified signal is injected into a waveforming circuit 26 (FIG. 3) which shapes the signal "spikes" from the HF amplifier to give signals of longer duration. The resulting signal from an impedance-matching transistor TR4 is applied over line 60 to the heat detector circuit and over line 62 to the smoke detector and fault circuits.

To begin with the heat detector, the sawtooth signal is injected into an integrating circuit 28 connected to one input of a differential amplifier 64, the second input of which is coupled to the amplifier output to give negative feedback of a fixed level. The decay characteristics of the integrating circuit is designed to prevent the signal resulting from the 1,000 Hz pulses, in normal ambient conditions, from switching the differential amplifier. However, when the beam passes through hot air resulting from a fire, the overall signal will be modulated in the range of 1 to 150 Hz. A signal modulated in the range 2 Hz to 25Hz, the range in which most of the flucutations will occur, exceeds the rate of the integrating circuit and causes the differential amplifier to respond. Negative-going pulses in the output of the differential amplifier are bypassed to earth and the positive-going signal is used to charge a capacitor C14 whose voltage is applied to the gate of a field-effect transistor FET1. The signal from the transistor FET1 is applied through transistors TR5 and TR6 to the gate of a thyristor SCR1 which controls an indicator lamp and an alarm relay circuit through the line 66. The circuits 32 and 34 between them provide a time delay to prevent response of the thyristor to transient thermal disturbances of the air in the beam path or a transient blocking of the beam.

Turning now to the smoke detection circuit (FIG. 4), the signal on line 62 passes through a diode D6 and resistor R42 to an integrating capacitor C22. The voltage across this capacitor is applied through a diode D7 to one input of a differential amplifier IC3. A potential divider consisting of resistors R43 and R44 permits a signal representing about one half of the integrating capacitor voltage to be applied through a diode D8 to a capacitor 23 which represents the quiescent signal store.

Under normal quiescent operation the differential amplifier is biased to a zero-output state by the higher voltage at its first input. In the event of smoke entering the beam, the receiver signal is attenuated and the amplitude of the charging pulses applied to the reservoir capacitor C22 is consequently reduced. Thus the voltage at the first input of the amplifier is decreased, whereas that at the second input will be maintained for a predetermined period because of the relatively slow discharge of the capacitor C23. If the voltage at the first input falls below that at the second, the amplifier is driven to the ON state. An signal is consequently applied to the gate of the silicon controlled rectifier SCR2, which controls an alarm relay and indicator lamp circuit through line 72. The thyristor circuit is damped by a capacitor to prevent spurious triggering by transient signals. Typically, an alarm signal is rgistered when the peak voltage of pulses applied to the integrating capacitor C22 falls below 50 percent of the normal quiescent level.

The fault circuit of FIG. 5 also receives a signal over line 62 and through the diode D6 and resistor R42. This signal is applied to one input of a differential amplifier IC2 operating in the D.C. switching mode. The second input of this amplifier is biased from a potential dividing network connected across the power supply, the bias holding the amplifier in its OFF state under normal quiescent conditions. In the event of a fault due either to failure of the transmitted beam or to continuous obstruction of the beam, the signal pulses necessary to maintain the charge at the integrating capacitor C22 are discontinued. The stored energy is then discharged and the reduced voltage at the first input of the amplifier IC2 causes this amplifier to switch to its ON state. In order to reject transient fault signals, the amplifier output is applied to a resistance/capacitance network 54 with a time constant of approximately 1 second, the resulting signal being applied through transistors TR8 and TR7 to control a fault warning relay and indicator lamp. The fault warning relay is arranged to override the smoke detection system if it is initiated first.

Turning now to FIG. 6, the connection 66 (see also FIG. 3) at the output of the heat detecting circuit extends through an indicator lamp LP1 and through a resetting switch contact 68 to a supply line 70. The line 66 is also connected to the supply line through a parallel branch including rectifier D3 and a fire relay FR and the resetting contact. Thus when thee rectifier SCR1 is triggered the lamp LP1 is illuminated and the fire relay is energised.

Similarly, line 72 at the output of the smoke detector circuit (see also FIG. 4) is connected through a contact FA3 (which is closed during normal operation of the apparatus) to a lamp LP2 and, through a diode D4, to the fire relay FR, which is common to both the heat and the smoke circuits. When the rectifier SCR2 triggers it completes the circuit through the relay and through the indicator lamp to the supply line 70. It also completes a locking circuit through contact FR2.

Line 74 at the output of the fault circuit (see also FIG. 5) is connected to transistor TR7 which passes current during normal operation of the apparatus. As a consequence, a fault relay FA (FIG. 6) is energised and a contact FA2 in series with a lamp LP4 is opened. When a fault occurs, the transistor TR7 becomes non-conducting, the relay FA is de-energised, the lamp LP3 (which is illuminated for normal working) is also de-energised, and the contact FA2 closes to illuminate lamp LP4, showing that the fault exists. In addition, contact FA3 in series with line 72 opens to prevent the generation of a smoke signal.

Diode D5 conducts in the presence of a smoke signal and this holds the relay in its energised condition so that whatever subsequently happens on line 74, the smoke relay remains energised.

If desired, the radiation source and the detector may be arranged at the same end of a room to be protected, with a reflector at the opposite end. This has the advantage that the wiring for both the source and the detector can then be restricted to one end of the room. A corner cube mirror can be used.

I claim:

1. Fire-detecting apparatus comprising: a source of radiation including a solid-state emitter emitting a beam of radiation in a series of pulses; radiation-receiving means positioned to receive radiation which has passed through an intervening gaseous medium from the said source and including a device sensitive to the received radiation to produce a corresponding electric signal, the beam of radiation, where incident on the radiation-receiving means, overlapping the radiation-receiving means around the whole of its perimeter; a frequency-selective circuit for selecting from the output of the radiation-sensitive device a pulse signal resulting from the pulses of radiation from the said source; and an alarm circuit connected to receive this pulse signal and responsive to an amplitude modulation thereof indicative of the effect of a fire on the said intervening gaseous medium.

2. Fire-detecting apparatus in accordance with claim 1, in which the source of radiation is an infra-red light source of the gallium arsenide kind.

3. Fire-detecting apparatus in accordance with claim 1, in which the radiation-sensitive device is a photo-transistor.

4. Fire-detecting apparatus in accordance with claim 3, including means whereby the photo-transistor is given a constant forward bias.

5. Fire-detecting apparatus in accordance with claim 4, in which the forward biasing means is a subsidiary source of radiation, located at the radiation-receiving means, and arranged to irradiate the photo-transistor at a substantially constant level.

6. Fire-detecting apparatus in accordance with claim 1, in which the frequency response of the frequency-selective circuit is substantially greater than the pulse repetition frequency of the emitted pulses of radiation.

7. Fire-detecting apparatus in accordance with claim 1, in which the alarm circuit includes a frequency-selective audio frequency circuit.

8. Fire-detecting apparatus in accordance with claim 7, in which the maximum response of the said audio frequency circuit occurs in the frequency range of 2 Hz to 25 Hz.

9. Fire-detecting apparatus in accordance with claim 1, including a further alarm circuit responsive to a reduction in the amplitude of the said pulse signal indicative of at least a partial obscuration of the said emitted radiation.

* * * * *